(12) United States Patent
Neumann et al.

(10) Patent No.: US 8,560,244 B2
(45) Date of Patent: Oct. 15, 2013

(54) MODELLING

(75) Inventors: Cedric Neumann, Birmingham (GB); Roberto Puch-Solis, Birmingham (GB)

(73) Assignee: Forensic Science Service Ltd., Birmingham (GB)

(*) Notice: Subject to any disclaimer, the term of this patent is extended or adjusted under 35 U.S.C. 154(b) by 1286 days.

(21) Appl. No.: 12/053,107

(22) Filed: Mar. 21, 2008

(65) Prior Publication Data
US 2008/0234978 A1    Sep. 25, 2008

(30) Foreign Application Priority Data

Mar. 23, 2007 (GB) .................................. 0705616.1
Sep. 18, 2007 (GB) .................................. 0718164.7

(51) Int. Cl.
*G01N 33/48* (2006.01)
*G01N 31/00* (2006.01)
*G06G 7/48* (2006.01)
*G06G 7/58* (2006.01)

(52) U.S. Cl.
USPC ................... 702/19; 702/22; 703/11; 703/12

(58) Field of Classification Search
None
See application file for complete search history.

(56) References Cited

U.S. PATENT DOCUMENTS

| | | |
|---|---|---|
| 7,097,973 B1 | 8/2006 | Zenhausern |
| 7,172,897 B2 | 2/2007 | Blackburn et al. |

FOREIGN PATENT DOCUMENTS

| | | |
|---|---|---|
| WO | WO 2006/040564 A1 | 4/2006 |
| WO | WO 2006/040573 A1 | 4/2006 |

OTHER PUBLICATIONS

Chou et al., "A miniaturized cyclic PCR device—modeling and experiments." *Microelectronic Engineering* 61-62(2002): 921-925.
Chou et al., "Rapid genotyping with integrated continuous-flow PCT and bioelectronic detection." *7th International Conference on Miniaturized Chemical and Biochemical Analysis Systems (MicroTAS 2003)*, Oct. 5-9, 2003, Lake Tahoe, CA. Proceedings 1203-1206.
Lenigk et al., "A fully automated sample-preparation cartridge for geneexpression based diagnostics." *8th International Conference on Miniaturized Systems in Chemistry and Life Sciences (MicroTAS 2004)*. Sep. 26-30, 2000, Malmo, Sweden. Proceedings, vol. 2; 273-275.
Liu, R.H. et al., "Self-contained, integrated biochip system for sample-to-answer genetic assays." $7^{th}$ International Conference on Miniaturized Chemical and Biochemical Analysis Systems (MicroTAS 2003), Oct. 5-9, 2003, Lake Tahoe, CA. Proceedings 1319-1322.
Sadler et al., "Thermal management of BioMEMS." *IEEE Transactions on Components and Packaging Technologies* (2002): 1025-1032.

(Continued)

*Primary Examiner* — Larry D Riggs, II
(74) *Attorney, Agent, or Firm* — Merchant & Gould P.C.

(57) ABSTRACT

The method provides for the fitting of a different distribution to the tail of a distribution of continuous data, than that distribution fitting to the rest of the distribution. By fitting a distribution to this set of occurrences only, better distributions shapes are obtained for that part of a distribution which might otherwise be overly sensitive to individual or small numbers of occurrences. Over sensitivity can make such distributions unreliable in situations where their value is compared with the value of another distribution. A distribution which does not decline quickly to zero is preferred for the tail, for instance a heavy tailed distribution.

30 Claims, 6 Drawing Sheets

(56) References Cited

OTHER PUBLICATIONS

Sadler et al., "Thermal management of BioMEMS: Temperature control for ceramic-based PCR and DNA detection devices." *IEEE Transactions on Components and Packaging Technologies* 26;2(2003): 309-316.
"Use of Extreme Value Statistics in Modeling Biometic Systems." Oct. 22, 2008 <http://www.cedar.buffalo.edu/~govind/CSE666/fall2007/EVS.pdf>. Powerpoint Presentation.
Coles, Stuart "An Introduction to Statistical Modeling of Extreme Values" Springer-Verlag London Limited. (2007).

MODELLING

BACKGROUND OF THE INVENTION

The present invention concerns improvements in and relating to modelling, particularly, but not exclusively modelling of distributions in forensic science.

SUMMARY OF THE INVENTION

According to a first aspect of the invention we provide a method of comparing a first representation of an identifier with a second representation of an identifier, the method including:
providing an expression of the first representation;
considering the expression of the first representation against a probability distribution based on the variation in the expression between different example representations of the second representations, to provide a first consideration;
considering the expression of the first representations against a probability distribution based on the variation in the expression between different population representations, to provide a second consideration;
using the first consideration and second consideration to provide a measure of comparison between the first representation and the second representation; and wherein one or both of the distributions was generated by a method comprising:
collecting a plurality of expressions of a data type;
selecting a sub set of the expressions;
fitting a distribution to the sub-set of expressions.

The first aspect of the invention may include any of the features, options or possibilities set out elsewhere within this document, including in the second and/or third aspects.

According to a second aspect of the invention we provide a method of establishing a probability for an occurrence, the method comprising considering the occurrence against a probability distribution based on the variation in the occurrence; and wherein the distribution was generated by a method comprising:
collecting a plurality of occurrences of a data type;
selecting a sub set of the occurrences;
fitting a distribution to the sub-set of occurrences.

The probability of occurrence may be used in a method of comparing a first representation of an identifier with a second representation of an identifier. The occurrence or occurrences may be an expression or expressions, for instance of a first representation. The method may include providing an expression of the first representation. The method may include considering the expression of the first representation against a probability distribution based on the variation in the expression between different example representations of the second representations, to provide a first consideration. The method may include considering the expression of the first representations against a probability distribution based on the variation in the expression between different population representations, to provide a second consideration. The method may include using the first consideration and second consideration to provide a measure of comparison between the first representation and the second representation. One or both of the distributions may be generated by a method comprising: collecting a plurality of expressions of a data type; selecting a sub set of the expressions; and fitting a distribution to the sub-set of expressions.

The second aspect of the invention may include any of the features, options or possibilities set out elsewhere within this document, including in the first and/or third aspects.

According to a third aspect of the invention we provide a method of generating a distribution, the method comprising:
collecting a plurality of occurrences of a data type;
selecting a sub set of the occurrences;
fitting a distribution to the sub-set of occurrences.

The method may include its use in a method of establishing a probability for an occurrence. The method for establishing the probability for an occurrence may comprise considering the occurrence against a probability distribution based on the variation in the occurrence.

The method may include its use in a method of comparing a first representation of an identifier with a second representation of an identifier. The occurrence or occurrences may be an expression or expressions, for instance of a first representation. The method of comparison may include providing an expression of the first representation. The method of comparison may include considering the expression of the first representation against a probability distribution based on the variation in the expression between different example representations of the second representations, to provide a first consideration. The method of comparison may include considering the expression of the first representations against a probability distribution based on the variation in the expression between different population representations, to provide a second consideration. The method of comparison may include using the first consideration and second consideration to provide a measure of comparison between the first representation and the second representation. The method may include one or both of the distributions being generated by a method comprising: collecting a plurality of expressions of a data type; selecting a sub set of the expressions; and fitting a distribution to the sub-set of expressions.

The third aspect of the invention may include any of the features, options or possibilities set out elsewhere within this document, including in the first and/or second aspects.

The first and/or second and/or third aspects may include any of the following features, options or possibilities.

The distribution may be a probability distribution. The distribution may be a frequency distribution. Where two or more distributions are provided, preferably they are of the same type.

The occurrences may be physically collected. The occurrences may be generated, for instance by a model or modelling process.

The plurality of occurrences may number at least 1000, preferably number at least 5000, more preferably number at least 20000 and ideally number at least 100000.

The occurrences may individually be rare, for instance with a frequency of less than 0.001, or even less than 0.0001.

The occurrences may be examples or particular forms of a data type. An occurrence may be an expression.

The data type may be evidence collected from a crime scene and/or by law enforcement authorities and/or forensic scientists.

The data type may be a representation, for instance a representation of an identifier.

The identifier may be a biometric identifier or other form of marking. The identifier may be a fingerprint, palm print, ear print, retina image, foot print, shoe print or a part of any of these. The first and/or second representation may be a full or partial representation of the identifier. The first representation may be from the same or a different source as the second representation.

The data type may be a set of information, for instance information of a continuous form. The information may be on forensic evidence. The information may be on handwriting.

The occurrence or expression may be provided in the form of a vector, for instance a feature vector. The first and/or second representations an/or example representations and/or population representations may be so provided. The feature vector may include information relating to the type of feature, one or more distances between one or more features, one or more direction between features The sub-set of occurrences may be those occurrences at one extreme of the range of occurrences. The sub-set of occurrences may be those occurrences with a value above a set value. The sub-set of occurrences may be those occurrences with a value below a set value. The sub-set of occurrences may be a number of occurrences, for instance a number at one end of the range of occurrences. The number might be pre-determined. The number might be less than 1000, preferably less than 500 and ideally less than 250. The end may be the higher or lower end. The sub-set of occurrences may be a proportion of occurrences, for instance a proportion at one end of the range of occurrences. The proportion might be predetermined The end may be the higher or lower end. The sub-set of occurrences may be a percentage of occurrences, for instance at one end of the range of occurrences. The percentage might be pre-determined. The percentage might be less than 0.5%, preferably less than 0.1% and ideally less than 0.05%. The end may be the lower or higher end. The sub-set of occurrences may be those above or below a percentile. The percentile might be predetermined.

The fitting of the distribution may be applied to one end of the range of occurrences. The end might be the higher end. The end might be the lower end. The method of fitting a distribution may be separately applied to both ends of the range of occurrences.

The fitted distribution may be a heavy tailed distribution. The fitted distribution for a variable X, may be classed a heavy tailed distribution if $Pr[X>x] - x^{-\forall}$ as x 6 4, $0<\forall<2$. A heavy tailed distribution may be classed as one for which a logarithm of the range is curvilinear.

The fitted distribution may be an exponential distribution. The fitted distribution may be a Weibull distribution. The fitted distribution may be a Cauchy distribution. The fitted distribution may be a half Cauchy distribution. The fitted distribution may be a generalised Pareto distribution. The fitted distribution may be a Pareto distribution. The fitted distribution may be an extreme value distribution.

The method might include fitting a second distribution to another part of the plurality of occurrences. The second distribution might be of a different type to the first distribution. The second distribution might be a normal distribution. The second distribution might be a mixture of normal distributions. The second distribution might be a Poisson distribution. Preferably the second distribution is not a heavy tailed distribution.

The another part of the plurality of occurrences may be the whole of the plurality of occurrences. The another part of the plurality of occurrences may be the plurality of occurrences other than the sub-set used to fit the first distribution. The another part of the plurality of occurrences may be exclude one or more occurrences, for instance those of the sub-set.

A probability for an occurrence may be established by taking the value of that occurrence and obtaining the value of the probability therefor from the distribution.

The method may include the application of the steps of collecting a plurality of occurrences of a data type, selecting a sub-set of the occurrences, and fitting a distribution to the sub-set of occurrences for two different sets of occurrences.

The first set of occurrences may relate to the variation between different occurrences arising from the same source.

The source may be a single person. The source may be the same or different to the source of the first representation or the occurrence for which a probability is sought. The source may be a single sample. The source may be a single analysis. The first set of occurrences may relate to the within variability. Where the occurrence is an expression of a first representation, the set of occurrences/expressions may relate to the variation in the expression between different example representations of the second representations. A first consideration may be so provided.

The second set of occurrences may relate to the variation between different occurrences arising from the different sources. The different sources may be a plurality of people. The different sources may be a plurality of samples. The different sources may be a plurality of analyses. The second set of occurrences may relate to the between variability. Where the occurrence is an expression of a first representation, the set of occurrences/expressions may relate to the variation in the expression between different population representations. A second consideration may be so provided.

Where the method is applied to two different sets of occurrences, the method may include fitting a second distribution to another part of the plurality of occurrences in each case.

The method may include, for an occurrence obtaining a first probability from a distribution and obtaining a second probability from a further distribution.

The distribution may be a first distribution obtained from the sub-set of occurrences or a second distribution obtained from all the plurality of occurrences or all of the plurality of occurrences except for the sub-set or all of the plurality of occurrences except for one or more excluded occurrences. The distribution may relate to the variation between different occurrences from the same source.

The distribution may be a further distribution obtained from a second plurality of occurrences, for instance from a second sub-set of the second plurality of occurrences or a second distribution obtained from all the second plurality of occurrences or all of the second plurality of occurrences except for the second sub-set or all of the plurality of occurrences except for one or more excluded occurrences. The distribution may relate to the variation between different occurrences from a variety of sources and/or a population.

The method may include establishing the ratio of the first probability to the second probability or of the second probability to the first probability. The ratio may provide a likelihood ratio.

The fitted distribution and/or further fitted distribution and/or second distribution and/or further second distribution may be obtained and stored. The distributions may be obtained and stored for future use in the method of the first or second aspects of the invention.

The use of the first consideration and second consideration may be to evaluate a hypothesis. The hypothesis may include, particularly as the first consideration, that the first representation and the second representation are from the same source. In the first consideration, the expressions of the first and/or second representations may be assumed to have the same discrete pieces of information. The probability distribution may be based upon differences between expressions of the representations, particularly in terms of their continuous pieces of information. The hypothesis may include, particularly as the second consideration, that the first representation and the second representation are from different sources. In the second consideration, the expressions of the first and/or second representations may be assumed to have the same discrete pieces of information. The probability distribution may be based upon differences between expressions of the representations, particularly in terms of their continuous pieces of information.

The use of the first consideration and second consideration to evaluate a hypothesis, may be the evaluation of a first hypothesis, for instance a prosecution hypothesis, and a second hypothesis, for instance a defence hypothesis. The evaluation may be expressed as:

$$LR = \frac{Pr(fv_s, fv_m|H_p)}{Pr(fv_s, fv_m|H_d)}$$

where $fv_s$ denotes a feature vector which comes from the second representation when conditioned on Hp and from an unknown source when conditioned on $H_d$, $fv_m$ denotes a feature vector originating from the first representation.

The method may include the addition of a data value to, or to the data set underlying, the probability distribution and/or sub-set thereof. The probability distribution may be based on the variation in the occurrence. The probability distribution may be based on the variation in the expression between different example representations of the second representations. The probability distribution may be based on the variation in the expression between different population representations. Preferably the data value is added to both probability distributions and/or both sub-sets thereof The data value may be added at the position of an occurrence, particularly an occurrence for which the method obtains a first probability from a distribution and obtains a second probability from a further distribution, for instance to establish a likelihood ratio. Preferably the data value is only added for the purposes of the consideration of the occurrence. Preferably the data value is not included in the stored data for the first and/or second distributions. Preferably the distribution fitted to the sub-set of expressions is fitted to a sub-set of expressions including the data value. Preferably the shape of the distribution fitted to the sub-set of expressions and/or fitted to the first distribution and/or fitted to the second distribution is different in shape to the distribution which would have been fitted with the data value absent. The method may include establishing the ratio of the first probability to the second probability or of the second probability to the first probability, including the data value within one and preferably both of the distributions. The ratio may provide a likelihood ratio.

The method may be used to provide a result. The result may be a report, document or other record, for instance for use as evidence in legal proceedings. The result may be that a match exists between the first representation and the second representation. The result may be the a match does not exist between the first representation and the second representation.

The result may be displayed to a user, for instance via a electronic device, such as a display unit, and/or via a print out, such as from a computer peripheral or electronically controlled print device. The result may be stored in a memory, for instance in a computor, database, electronic device or solid state memory device.

The method may be a computer implemented method, and in particular a method implemented by an expert system. The method may involve data stored in or transferred through one or more computer systems. Embodiments of the present invention also relate to an apparatus for performing these operations. This apparatus may be specially constructed for the required purposes, or it may be a general-purpose computer selectively activated or reconfigured by a computer program and/or data structure stored in the computer, particularly for implementing the method. The method and/or processes presented herein are not inherently related to any particular computer or other apparatus. In particular, various general-purpose machines may be used with programs written in accordance with the teachings herein, or it may be more convenient to construct a more specialized apparatus to perform the required method steps.

In addition, embodiments of the present invention relate to computer readable media or computer program products that include program instructions and/or data (including data structures) for performing various computer-implemented operations to provide the method. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

BRIEF DESCRIPTION OF THE DRAWINGS

Various embodiments of the invention will now be described, by way of example only, and with reference to the accompanying drawings in which.

Over recent years, various individuals involved in the criminal justice system have proposed to use likelihood ratios, LR's, in reporting forensic evidence in court proceedings. This allows for more objectivity and greater transparency.

The likelihood ratio of a particular piece of evidence material originating from a reference material (be that a given person or location or sample) is obtained by weighing:

the probability that the evidence material originates from the reference material (the study of the within variability of the reference material);

against the probability that the evidence material originates from any other potential sources from a reference population (the study of the between variability of the reference population).

An LR can be computed for discrete or continuous data. Much of the use of LR's to date has been in the context of aspects of forensic science where the data is discrete, in particular DNA profiles.

The DNA evidence is computed using discrete frequency values. Typically, an allele is determined for a locus and a frequency is established for that particular allele occurring at that locus. As there is independence between the loci considered, the individual frequencies from the individual loci are multiplied together. The individual frequencies for an allele occurring are quite small, perhaps as low as 0.001, but the occurrence of an allele is still far from being a rare event.

Many other LR's encountered in forensic science are based upon continuous data. Such a situation occurs with fingerprint, shoe mark and handwriting analysis evidence.

Taking the example of a fingerprint statistical model designed in a similar fashion, then the LR is not a multiplication of the occurrence of fairly common events (as alleles are) because the features or minutiae consider have not been established to be independent of one another. Indeed, present thinking is that they are unlikely to be independent of one another. As a result, in fingerprints, all of the information on all of the features are considered together. Such information might be the type of feature, one or more distances to other features, one or more directions to one or more other features and the like. An example of the approach which might be taken to extract, represent and compare such information is provided in WO2006/040564. Sufficient numbers of features need to be considered to provide highly discriminating identification. When taken as a whole, any one individual form for the information is an extremely rare occurrence. Hence, the LR's in such situations are computed based upon the use of very rare events. The approach is considering the possibility of randomly finding the same or very similar one individual forms for the information within a population; a terribly small probability. The use of very rare events brings problems with it.

DETAILED DESCRIPTION OF THE PREFERRED EMBODIMENTS

Figure 1:
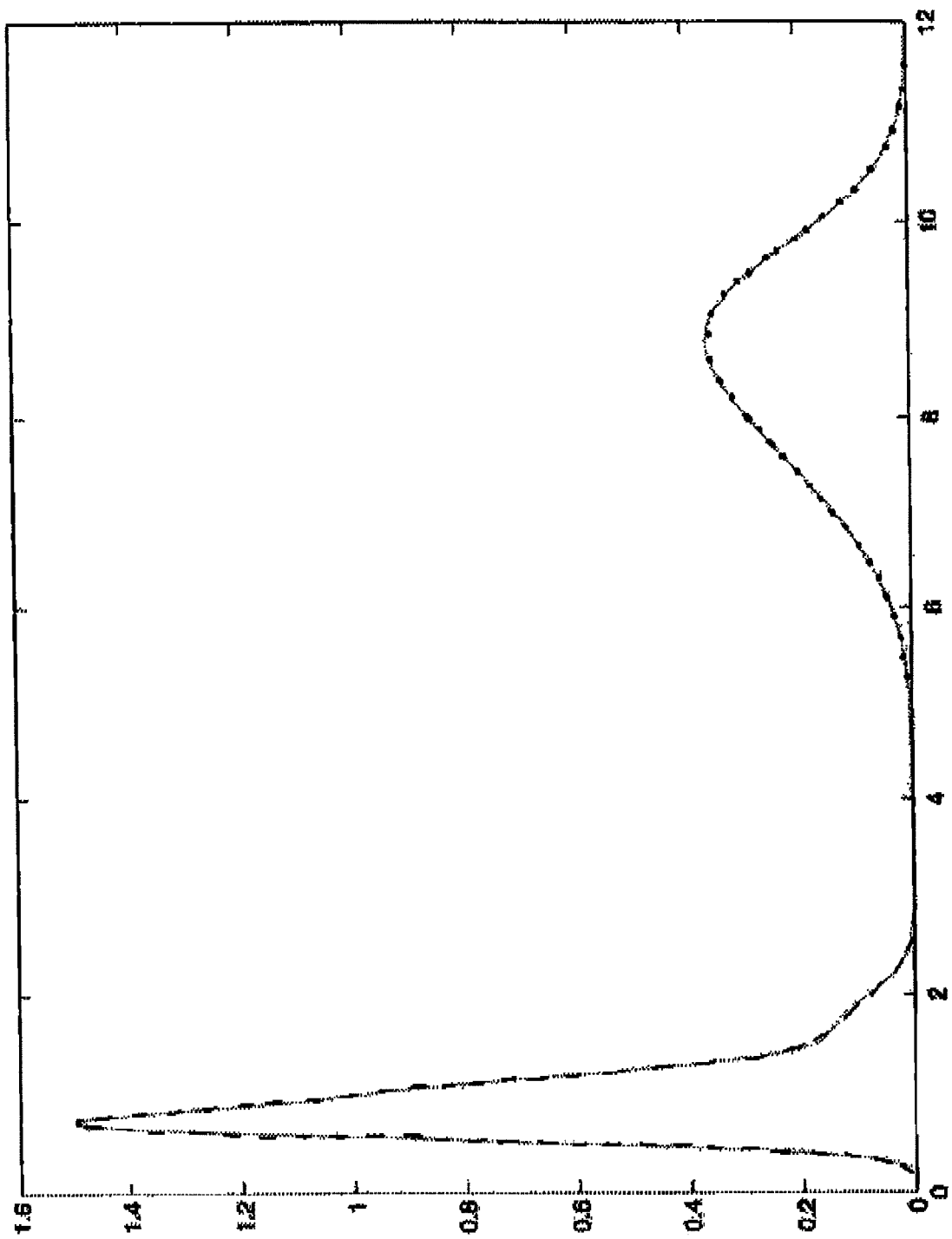
FIG. 1 is an illustration of a within variability distribution and a between variability distribution.

FIG. 1 provides an illustration of the distribution for both the within variability (dashed line) and the between variability (dotted line) in a computation of an LR of a fingerprint comparison. Further explanation of such an approach to the comparison of fingerprints or other biometric markers is to be found in WO2006/040573, the contents of which are incorporated herein by reference, particularly in relation to the description of the generation, consideration and use of the two probability distributions.

The greater the number of features or minutiae considered, such as bifurcations or ridge ends, and/or the greater amount of information considered on those features, then the greater the separation between the two distributions.

The distance separation between the two distributions brings with it a problem when the LR is considered as basically the ratio of the value for one of the distributions at that point (normally a distance) compared with the value of the other. The value for the between variability at that point is extremely low. Significantly, its value is not robustly provided, however, because it is so small.

When the distribution for the between variability is considered, this is fitted to the number of occurrences observed at a given distance. As the distance increases and moves away from the core part of the between variability distribution the number of occurrences decreases. A point is reached at which this number of occurrences is very small or becomes non-existent. The tail part of the between variability distribution of interest for the LR may be at a far greater distance than this. As a result, the fit of the distribution is crucial.

Usually, distribution fitting approaches are not overly concerned with this part of the distribution. However, as a result, the tail part of the distribution has been found to be heavily influenced by the last few occurrences in the data to which the distribution is fitted. As a result, the part of the distribution of interest is influenced heavily by the presence or absence of one or a couple of occurrences at the large distances. These few occurrences are a very, very small number compared with the overall number of occurrences considered in the distribution and hence have an undue influence on the tail. The influence is also unpredictable as in one set of data such an occurrence may be present at one distance, in another set of data at another distance and in a third set of data it may be absent.

Figure 2:
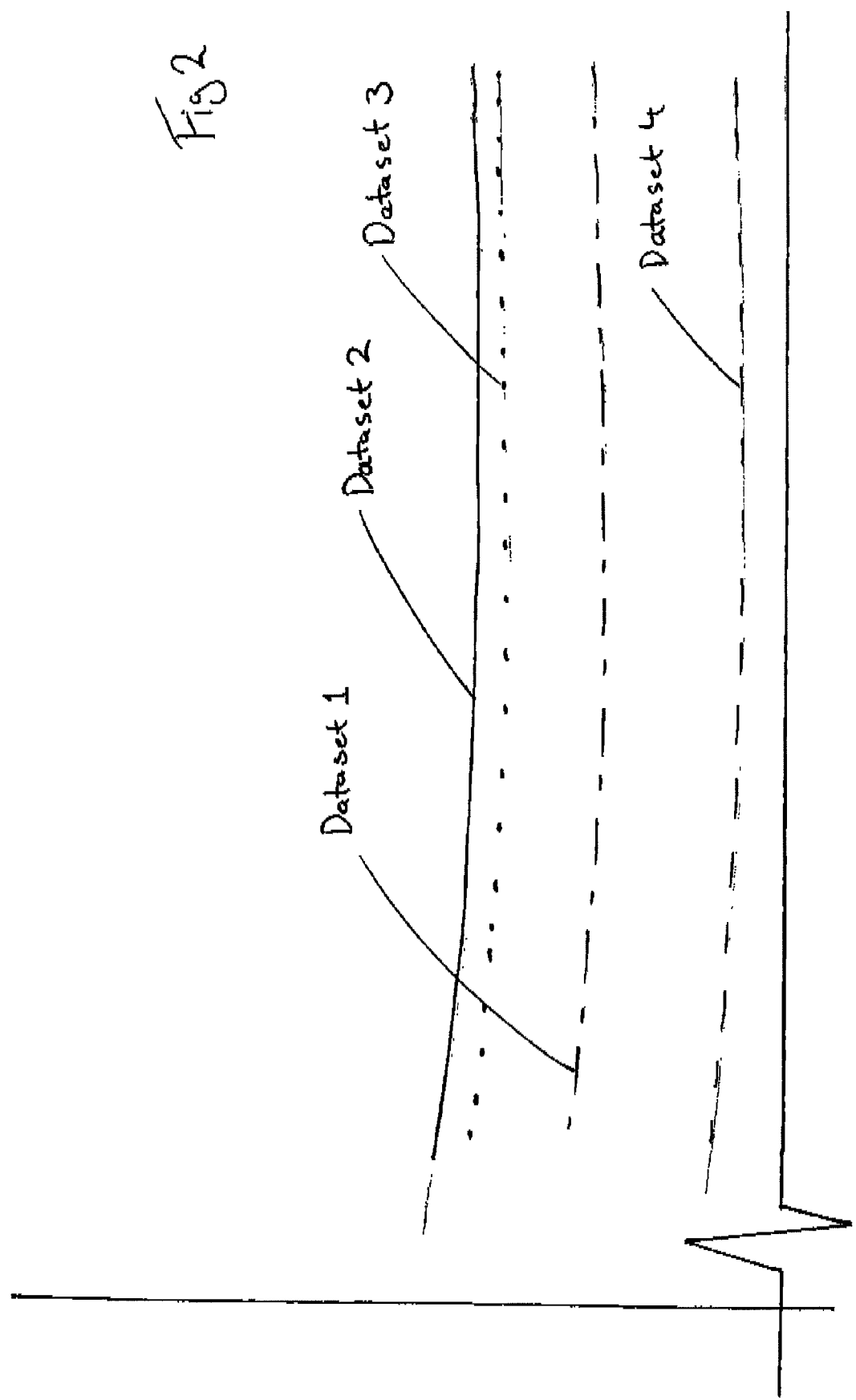
FIG. 2 is a schematic illustration of the effect of different occurrences within data sets on the form of the tail of a distribution.

FIG. 2 provides a schematic illustration of four different tails for distributions of the same consideration. In data set 1, the last occurrence is a single occurrence at distance X. In data set 2, the last occurrence is two occurrences at distance X; hence the tail is longer and has a greater value at this location. In data set 3, the last occurrence is a single occurrence at a distance considerably greater than X; so the tail has a higher value. In data set 4, the last occurrence is at a distance considerably less the X; so the value of the tail is much lower. With respect to the overwhelming majority of occurrences, the four data sets may be indiscernible from one another. In respect of the majority of the distribution, the shape and hence values of the distribution may be indiscernible from one another. In the extreme tail portion of the distribution, however, there are marked differences even though the distribution is of the same consideration.

In the approach of the present invention, the fitting of a distribution to the data is provided in a different way.

Figure 3:
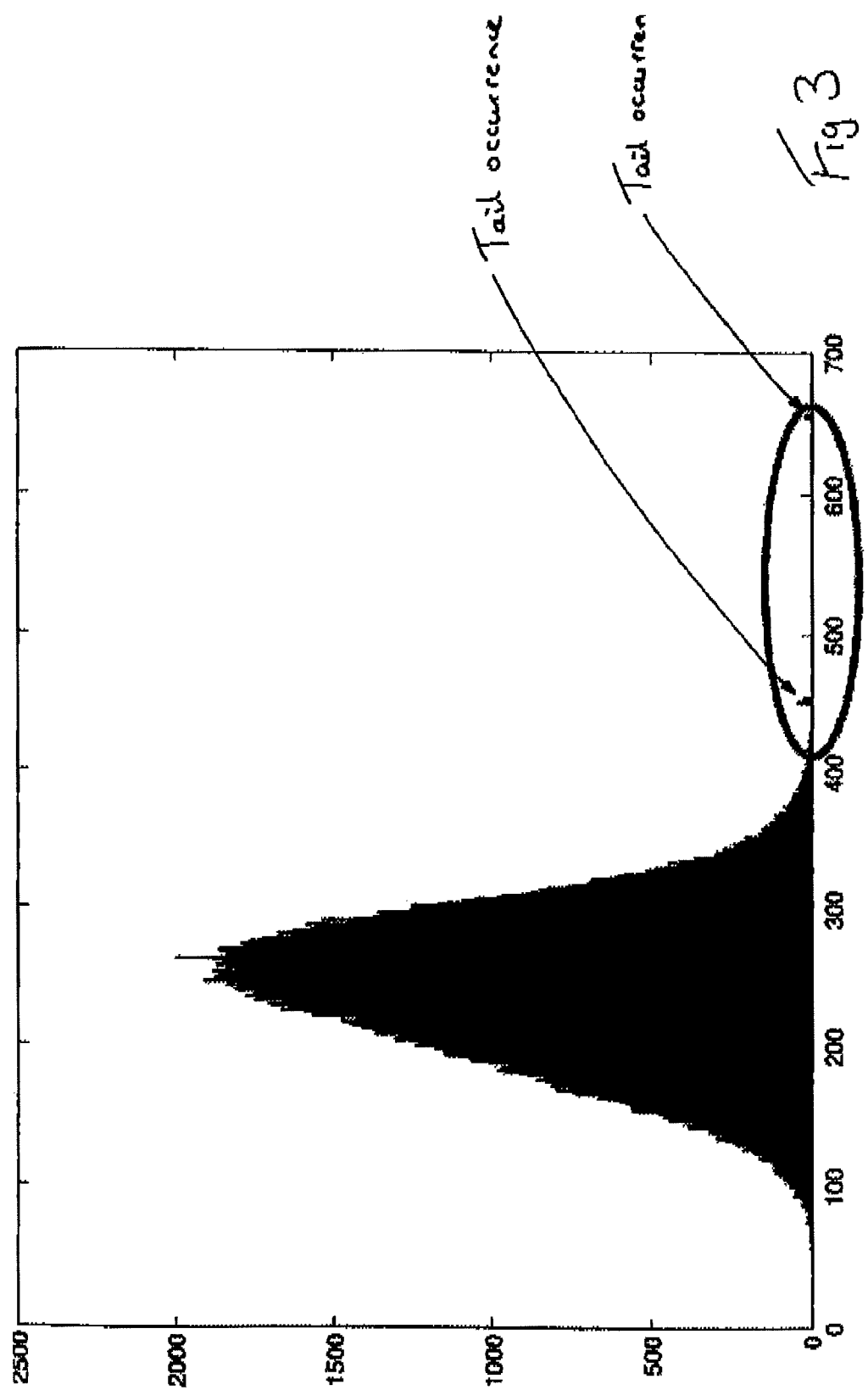
FIG. 3 is an illustration of a set of occurrences forming a data set.

The data which contributes to the tail part of the distribution is subjected to a separate consideration. The distribution of FIG. 3, has a number of occurrences in the tail part of the distribution. These are in the distance range 400 to 650. The occurrences in this range are only a very small number compared with the overall number of occurrences; compare the peak heights.

Figure 4:
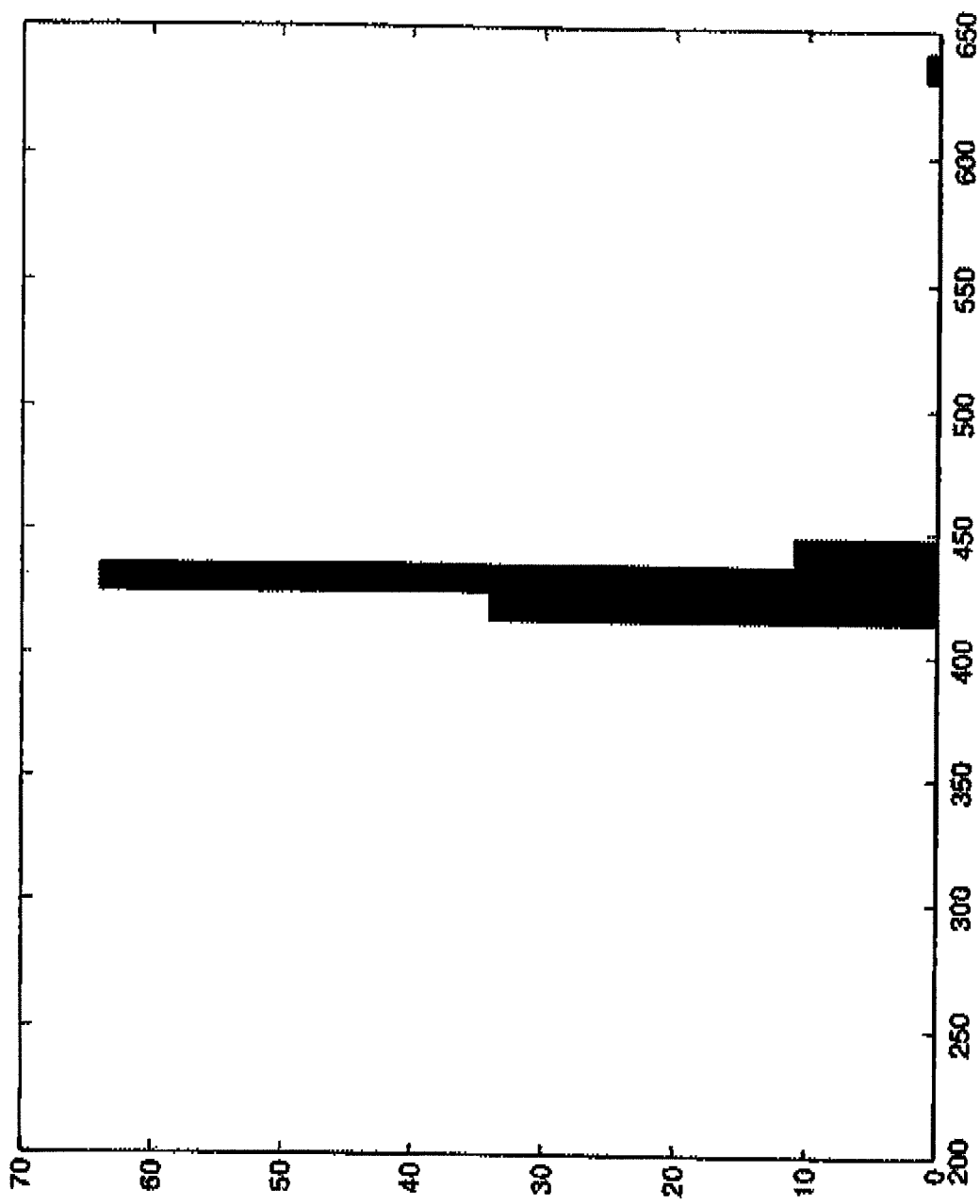
FIG. 4 is an illustration of the occurrences within the tail part of the data set of FIG. 3.

The tail occurrences are isolated and represent the data shown in FIG. 4. In this case, they represent 110 occurrences out of a total of 412,417 occurrences shown in FIG. 3.

A distribution is then fitted to this set of occurrences only. This contrasts with fitting a distribution to the total set of occurrences provided before. The nature of the distribution which is fitted is also different. A distribution which does not decline quickly to zero is selected; a heavy tailed distribution. Examples include an exponential distribution, Weibull distribution, Cauchy distribution and half Cauchy distribution. Other distributions may also be used, such as a generalised Pareto distribution, a Pareto distribution or an extreme value distribution.

Whilst this approach is applied to the tail of each distribution, the remaining occurrences (or even all the occurrences) are subjected to the fitting of a distribution too. This may be performed using the pre-existing approach to fit to the non-tail occurrences or to all the occurrences. For instance, a normal distribution, or a mixture of normals may be used. The distribution fitted to just the tail is considered in preference to the distribution fitted generally when a distance in that part of the distribution is being considered.

When establishing the LR, for instance between a crime scene mark and a fingerprint from a suspect, the distance in question is considered. At that distance, the value of the within variability distribution is obtained and this is compared with the value of the between variability distribution at that distance, the between variability distribution being the distribution fitted only to the tail occurrences. Normally, the value for the within variability distribution would also be taken from a distribution fitted to its tail only.

The probability resulting can be scaled to account for the ratio between the number of occurrences used to model the tail part only and the number of occurrences in total.

Various possibilities for selecting the occurrences to consider as the tail. A number of occurrences can be set. A percentile of occurrences can be set.

An improved ability to calculate LR's is provided in this way as reliable computation of very small probabilities is provided by computing them using two more robust steps, rather than one less accurate one. The problems with the over fitting of the prior approach is avoided.

Whilst the approach has been described in the context of fingerprints, it is useful in the case of any continuous data form of evidence.

By way of example, and in the context of a fingerprint, the information on the fingerprints can be provided as feature vectors. The likelihood ratio is the quotient of two probabilities, one being that of two feature vectors conditioned on their being from the same source, the other two feature vectors being conditioned on their being from different sources.

This can be presented as the expression:

$$LR = \frac{Pr(fv_s, fv_m|Hp)}{Pr(fv_s, fv_m|Hd)}$$

where the feature vector fv contains the information extracted from the representation and formatted. The addition of the subscript s to this abbreviation denotes that a feature vector comes from the suspect, and the addition of the subscript m denotes that a feature vector originates from the crime. The symbol $fv_s$ then denotes a feature vector from the known source or suspect, and $fv_m$ denoted the feature vector originated from an unknown source from the crime scene.

The preferred forms for the quotient are discussed in more detail below.

In general terms, the data driven approach involves the consideration of a quotient defined by a numerator which considers the variation in the data which is extracted from different representations of the same fingerprint and by a denominator which considers the variation in the data which is extracted from representations of different fingerprints. The output of the quotient is a likelihood ratio.

In order to quantify the likelihood ratio, the feature vector for the first representation, the crime scene, and the feature vector for the second representation, the suspect are obtained, as described in WO2006/040564. The difference between the two vectors is effectively the distance between the two vectors. Once the distance has been obtained it is compared with two different probability distributions obtained from two different databases.

In the first instance, the probability distribution for these distances is estimated from a database of prints taken from the same finger. A large number of pairings of prints are taken from the database and the distance between them is obtained. Each of the prints has data extracted from it and that data is formatted as a feature vector. The differences between the two feature vectors give the distance between that pairing. Repeating this process for a large number of pairings gives a range of distances with different frequencies of occurrence. A probability distribution reflecting the variation between prints of the same figure is thus obtained by fitting to these occurrences. In contrast to WO2006/040573, the fitting involves the use of the tail specific fitting process described above.

Ideally, the database would be obtained from a number of prints taken from the same finger of the suspect. However, the approach can still be applied where the prints are taken from the same finger, but that finger is someone's other than the suspect. This database needs to reflect how a print (more particularly the resulting triangles and their respective feature vectors) from the same finger changes with pressure and substrate.

In the second instance, the probability distribution for these distances is estimated from a database of prints taken from different fingers. Again a large number of pairings of prints are taken from the database and the distance between them obtained. The extraction of data, formatting as a feature vector, calculation of the distance using the two feature vectors and determination of the distribution is performed in the same way, but uses the different database.

This different database needs to reflect how a print (more particularly the resulting triangles and their respective feature vectors) from a number of different fingers varies between fingers and, potentially, with various pressures and substrates involved.

Having established the manner in which the databases and probability distributions are obtained, the comparison of a crime scene print against a suspect print is considered further.

Having extracted the data, formatted it in feature vector form and compared two feature vectors to obtain the distance between them, that distance is compared with the two probability distributions obtained from the two databases to give the assessment of match between the first and second representation.

Figure 5:
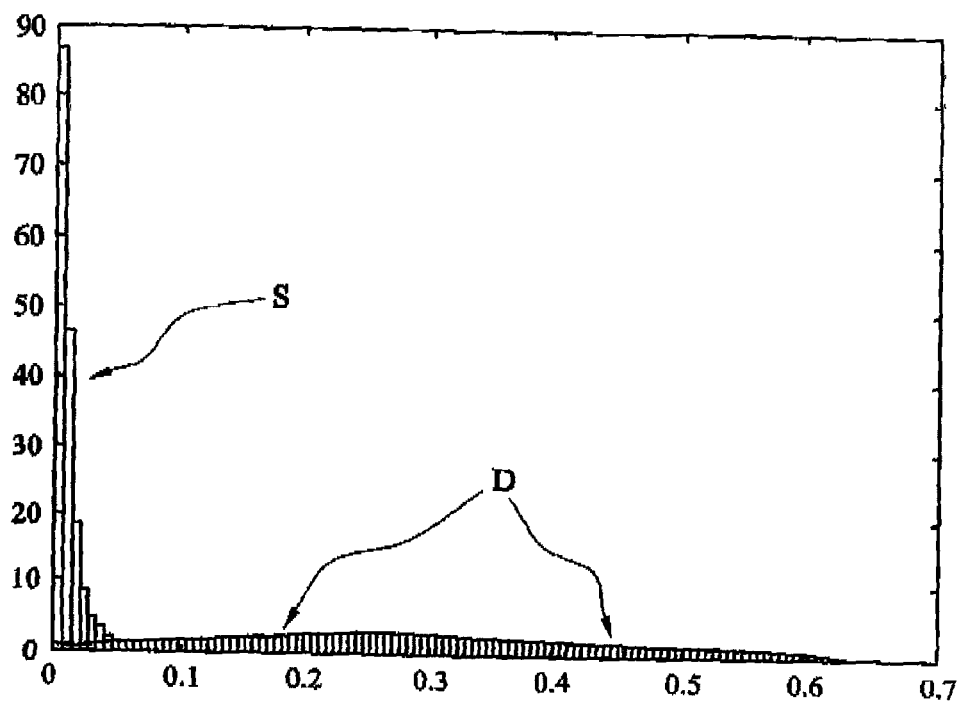
FIG. 5 is a representation of a probability distribution for variation in prints from the same finger and a probability distribution for variation in prints between different fingers.

In FIG. 5, the distribution for prints from the same finger is shown, S, and shows good correspondence between examples apart from in cases of extreme distortion or lack of clarity. Almost the entire distribution is close to the vertical axis. Also shown is the distribution for prints from the fingers of different individuals, D. This shows a significant spread from a low number of extremely different cases, to an average of very different and with a number of little different cases. The distribution is spread widely across the horizontal axis.

Figure 6:
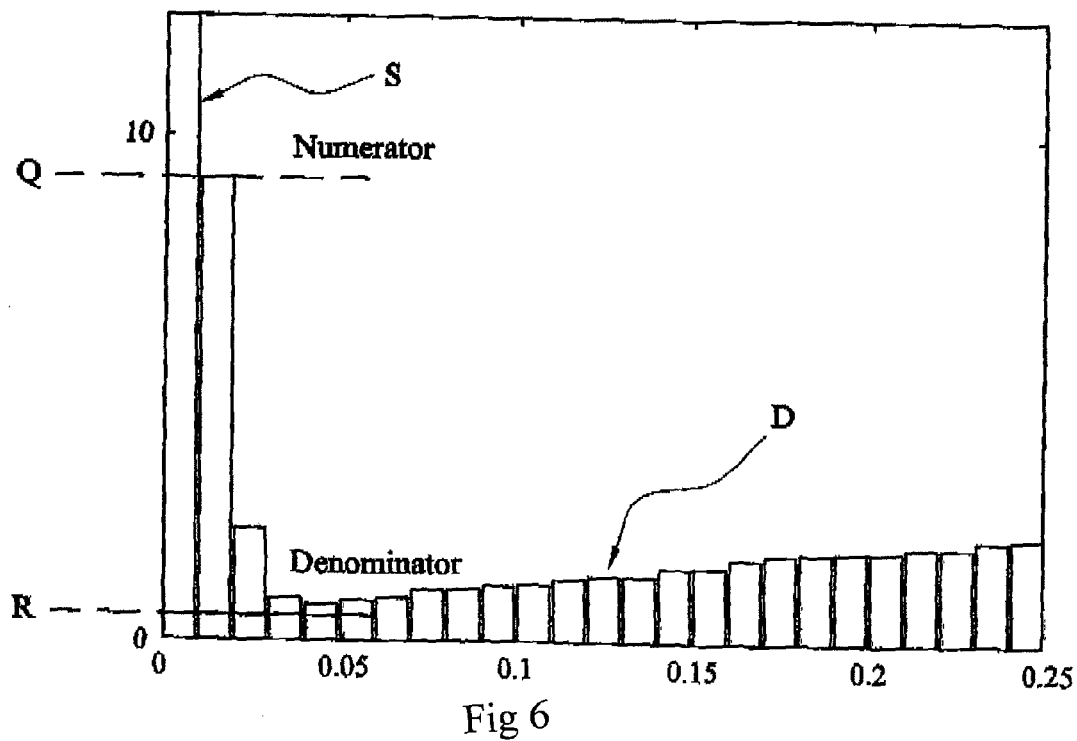
FIG. 6 shows the distributions of FIG. 5 in use to provide a likelihood ratio for a match between known and unknown prints.

In FIG. 6, these distributions are considered against a distance I obtained from the comparison of an unknown source (for instance, crime scene) and known source (for instance, suspect) fingerprint in the manner described above. At this distance, I, the values (Q and R respectively) of the distributions S and D can be taken, dotted lines. The likelihood ratio of a match between the two prints is then Q/R. In the illustrated case, distance I is small and so there is a strong probability of a match. If distance I were great then the value of Q would fall dramatically and the likelihood ratio would fall dramatically as a result. The later approach to the distance measure issue is advantageous as it achieves the result in a single iteration, provides a continuous output and does not require the determination of thresholds.

Figure 7A:
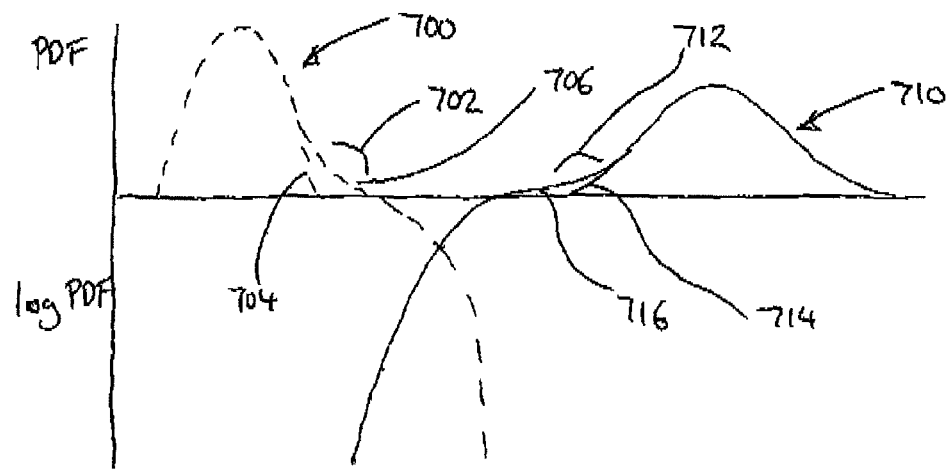
FIG. 7a is an illustration of a within variability distribution and a between variability distribution with a single distribution fitted to all of each distribution and with a tail specific distribution fitted to each according to the present invention.

In an improved version of the invention, the process by which the distribution is fitted to the tail is modified. As illustrated in FIG. 7a, an example using a within variability distribution and a between variability distribution is provided.

Above the horizontal axis, the probability density function, pdf, is displayed on a normal scale; below the horizontal axis, a log scale is used to emphasis the variation in the very small pdf's of interest. The within variability distribution provided, 700, has a tail 702. This tail 702 has been modified from the form given by applying a single distribution to the whole, 704, by applying a distribution specifically to the tail 702. In this case, a generalised Pareto distribution was used and results in the form 706. The between variability distribution provided, 710, has a tail 712. This tail 712 has been modified from the form given by applying a single distribution to the whole, 714, by applying a distribution specifically to the tail 712. In this case, a generalised Pareto distribution was used and results in the form 716. As can be seen, the section for which the two probability distributions overlap and each have a pdf value is small. The pdf value may be zero in locations where many of the comparisons arise.

To address this issue, the invention provides for a modification to the tail distribution fitting. This is described here with reference to the modification of a generalised Pareto distribution, but the approach also applies to other distribution types.

Figure 7B:
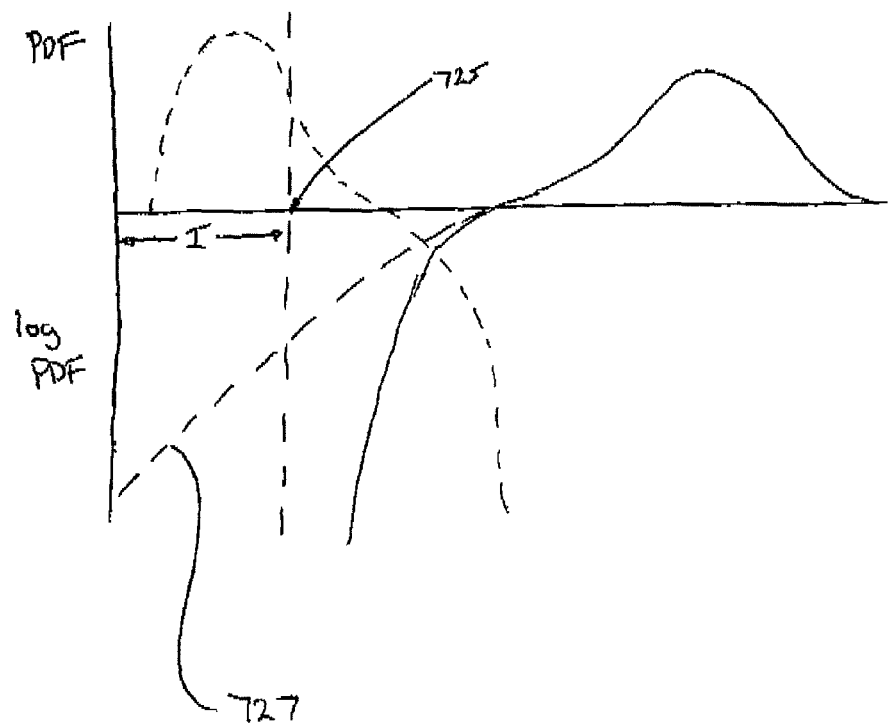
FIG. 7b is an illustration of the effect of modifying the data to which the distributions are fitted.

In the example of FIG. 7b, the distance I obtained from the comparison of an unknown source (for instance, crime scene) and known source (for instance, suspect) fingerprint in the manner described above is applied. The values of interest in the comparison are those of the two different distributions at this point. The within variability distribution has a significant value, P, whereas the between variability distribution is zero. This makes the determination of the likelihood ratio impossible. To address this, a data value 725 corresponding to the occurrence under consideration is introduced to both distributions. This is a data value 725 at distance I. This is added to both distributions only for the consideration and is not a permanent part of the data in either distribution and so does not participate in other considerations of other distances. The addition of the data value 725 has an impact upon the shape of each distribution. The impact varies according to the distance I and the distance at which the data value 725 is added to each distribution.

In the example shown, the data value 725 is added to the within variability distribution at a distance where there are many other data values already. This distance is not in the tail. Significantly, it has only a very small impact upon the shape of the distribution fitted. In the case of the between variability distribution, this data value 725 is added at a distance where there are few, or in this case, no data points previously. This distance is in the tail. Significantly, this data value 725 has a large impact upon the shape of the tail distribution fitted to the between variability distribution. The modified generalised Pareto distribution arising, 727, is shown in FIG. 7b. This allows a value for the pdf for the between variability distribution to be obtained too and so allow the comparison to conclude in a likelihood ratio.

The addition of the data value 725 is valid for each distribution as in the case of it arising due to within variability it is a data value which actually occurs and in the case of it arising due to between variability it is an occurrence within the population.

The invention claimed is:

1. A computer implemented method, wherein the method is a method of comparing a first representation of an identifier with a second representation of an identifier, the identifier being a biometric identifier or other marking, the identifier being of a type, the type being one of a fingerprint, a palm print, an ear print, a retina image, a footprint, a shoe print or a part of any of those, the first representation and the second representation being of identifiers of the same type, the method including:
providing an expression of the first representation by physically collecting the first representation of the identifier and extracting data therefrom to provide the expression;
considering the expression of the first representation against a probability distribution based on the variation in the expression between different example representations of the second representations, to provide a first consideration;
considering the expression of the first representations against a probability distribution based on the variation in the expression between different population representations, to provide a second consideration;
using the first consideration and second consideration to provide a measure of comparison between the first representation and the second representation;
wherein the measure of comparison is a likelihood ratio and wherein the measure of comparison is a result which is displayed to a user;
and wherein one or both of the distributions was generated by a method comprising:
collecting a plurality of expressions of a data type;
selecting a sub set of the expressions from the plurality of expressions, the sub-set of expressions being those expressions at one extreme of the range of expressions, the sub set of the expressions being a predetermined proportion of the expressions at one end of the range of expressions;
fitting a distribution to the sub-set of expressions;
fitting a second distribution to another part of the plurality of expressions; and
wherein the second distribution is of a different type to the first distribution.

2. A method according to claim 1 in which the method includes the addition of a data value to, or to the data set underlying, the probability distribution and/or sub-set thereof for one or both probability distributions and/or one or both sub-sets thereof.

3. A method according to claim 2 in which the data value is added at the position of an expression for which the method obtains a first probability from a distribution and obtains a second probability from a further distribution.

4. A method according to claim 2 in which the distribution fitted to the sub-set of expressions is fitted to a sub-set of expressions including the data value and the shape of the distribution fitted to the sub-set of expressions and/or fitted to the first distribution and/or fitted to the second distribution is different in shape to the distribution which would have been fitted with the data value absent.

5. A method according to claim 2, the method including establishing the ratio of the first probability to the second probability or of the second probability to the first probability, including the data value within one and preferably both of the distributions.

6. A method according to claim 1 in which the sub-set of expression is a percentage of the expressions.

7. A method according to claim 6 in which the percentage of expressions is less than 0.5% or less than 0.1% or less than 0.05%.

8. A method according to claim 1 in which the fitted distribution is a heavy tailed distribution.

9. A method according to claim 1 in which the fitted distribution for a variable X, is defined as a heavy tailed distribution if $Pr[X>x] - x - \forall$ as $x \in 4$, $0 < \forall < 2$.

10. A method according to claim 1, wherein the fitted distribution is selected from a Weibull distribution, a Cauchy distribution, a half Cauchy distribution, a generalised Pareto distribution, a Pareto distribution or an extreme value distribution.

11. A method according to claim 1 in which the method includes fitting a second distribution to another part of the plurality of expressions.

12. A method according to claim 11 in which the second distribution is selected from a normal distribution, a mixture of normal distributions, a Poisson distribution or not a heavy tailed distribution.

13. A method according to claim 11 in which another part of the plurality of expressions is the whole of the plurality of expressions.

14. A method according to claim 1 in which the probability for an expression is established by taking the value of that expression and obtaining the value of the probability therefor from the distribution.

15. A method according to claim 1 in which the method includes the application of the steps of collecting a plurality of expressions of a data type, selecting a sub-set of the expressions, and fitting a distribution to the sub-set of occurrences for two different sets of expressions.

16. A method according to claim 1 in which the first set of expressions relate to the variation between different expressions arising from the same source.

17. A method according to claim 1 in which the expression is an expression of a first representation, the set of expressions relates to the variation in the expression between different example representations of the second representations.

18. A method according to claim 1 in which the second set of expressions relate to the variation between different expressions arising from the different sources.

19. A method according to claim 1 in which the expression is an expression of a first representation, the set of expressions relates to the variation in the expression between different population representations.

20. A method according to any claim 1 in which the method is applied to two different sets of expressions and the method includes fitting a second distribution to another part of the plurality of expressions in each case.

21. A method according to claim 20 in which the method includes, for an expression obtaining a first probability from a distribution and obtaining a second probability from a further distribution.

22. A method according to claim 21 in which the distribution is a first distribution obtained from the sub-set of expressions or a second distribution obtained from all the plurality of expressions or all of the plurality of occurrences except for the sub-set or all of the plurality of expressions except for one or more excluded expressions.

23. A method according to claim 22 in which the distribution relates to the variation between different expressions from the same source.

24. A method according to claim 21 in which the further distribution obtained from a second plurality of expressions from a second sub-set of the second plurality of expressions or a second distribution obtained from all the second plurality of expressions or all of the second plurality of expressions except for the second sub-set or all of the plurality of expressions except for one or more excluded expressions.

25. A method according to claim 24 in which the further distribution relates to the variation between different expressions from a variety of sources and/or a population.

26. A method according to claim 21, the method including establishing the ratio of the first probability to the second probability or of the second probability to the first probability.

27. A method according to claim 1 in which the fitted distribution and/or further fitted distribution and/or second distribution and/or further second distribution are obtained and stored.

28. A method according to claim 1 in which the use of the first consideration and second consideration is to evaluate a hypothesis.

29. A method according to claim 28 in which the hypothesis includes, as the first consideration, that the first representation and the second representation are from the same source and/or the hypothesis includes, as the second consideration, that the first representation and the second representation are from different sources.

30. A method according to claim 1 in which the distributions are frequency distributions.

* * * * *